US006924912B2

(12) United States Patent
Takada

(10) Patent No.: US 6,924,912 B2
(45) Date of Patent: Aug. 2, 2005

(54) HOLOGRAPHIC SCREEN

(75) Inventor: Kenichirou Takada, Kuwana (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/397,232

(22) Filed: Mar. 27, 2003

(65) Prior Publication Data

US 2003/0184830 A1 Oct. 2, 2003

(30) Foreign Application Priority Data

Mar. 29, 2002 (JP) ........................................ 2002-095945

(51) Int. Cl.$^7$ ............................................... G02B 5/02
(52) U.S. Cl. ........................... 359/15; 359/599; 359/32; 359/1; 359/453
(58) Field of Search ............................... 359/15, 16, 1, 359/32, 35, 599, 453, 454

(56) References Cited

U.S. PATENT DOCUMENTS 6,288,803 B1   9/2001  Hattori et al.

FOREIGN PATENT DOCUMENTS

JP          11-202417        7/1999

Primary Examiner—Fayez G. Assaf
(74) Attorney, Agent, or Firm—Nixon & Vanderhye PC

(57) ABSTRACT

A holographic screen for displaying images by diffracting and dispersing an image beam projected by an image projector comprises a main hologram for diffracting and dispersing an incident image beam from one of an upward angle and a downward angle, and a directional dispersion hologram, disposed on an image projector side of the main hologram, for dispersing and transmitting part of the image beam within a predetermined angle range centered on a direction of incidence thereof, and directly transmitting another part of the image beam, thereby providing a holographic screen that can maintain the brightness and improve the color reproducibility of a displayed image.

10 Claims, 12 Drawing Sheets

HOLOGRAPHIC SCREEN

BACKGROUND OF THE INVENTION

1. Field of the Invention

The present invention relates to a holographic screen for displaying images by diffracting and dispersing an image beam projected by an image projector.

2. Description of the Related Art

Holographic screens for displaying images by diffracting and dispersing an image beam projected by an image projector are known in the prior art.

The hologram elements used in such a holographic screen are produced by recording a diffuser 98 on a photosensitive material 95 by means of an exposure optical system 9 such as that shown in FIG. 20.

In this system a laser beam 900 (of a wavelength of e.g. 514.5 nm) emitted from a laser (e.g. an Ar laser) oscillator 90 is separated into two directions by a semi-transparent mirror 990.

One of the separated beams is passed through two reflective mirrors 991 and is split into divergent beams by an objective lens 931, and then, is projected onto the photosensitive material 95. These divergent beams are reference beams 96.

The other of the separated beams is passed through another two reflective mirrors 992 and is split by an objective lens 932, and then, is guided to a parabolic mirror 99. The beams reflected by this parabolic mirror 99, after passing through the diffuser 98 to make diffused beams, are projected onto the photosensitive material 95. The diffused beams from the diffuser 98 are object beams 97.

The object beams 97 and reference beams 96 interfere with each other when the photosensitive material 95 is exposed to them. As a result, the diffuser 98 is recorded on the photosensitive material 95 to produce a hologram element.

In a holographic screen utilizing hologram elements produced in this way, the image projected from the image projector takes on a greenish hue, and the like, giving rise to the problem that the color of the projected image is not satisfactorily reproduced.

In response to this problem, as a method for improving the color reproducibility of the holographic screen, a method of laminating a directional dispersion film onto the holographic elements is disclosed in Unexamined Patent Publication (Kokai) No. 11-202417. Namely, a visibility control film "Lumisty" produced by Sumitomo Chem. Co. Ltd, serving as the above directional dispersion film, is laminated onto the holographic elements, for example.

Consequently, a given width is imparted on the angle of incidence of the image beams transmitted through the directional dispersion film and incident on the holographic elements, and they can be made so that bias does not occur in the wavelength distribution of the diffraction beams in the forward direction (normal direction of the holographic element). As a result, a holographic screen with excellent color reproducibility can be attained.

The principle of this color reproducibility improvement is as described in Unexamined Patent Publication (Kokai) No. 11-202417.

However, in the above prior art hologram screen, although the color reproducibility of the display elements is extremely favorable, there is the problem that brightness is overly reduced. The reason for this is that the directional dispersion film disperses the image beams more than is necessary. Namely, as shown in FIG. 21, the incident beam passes through the direction dispersion film while being continuously dispersed across a wide range. Consequently, the intensity of the beams incident on the holographic elements at substantially the same angle as the previously set angle of incidence of the image beam on the holographic elements is greatly weakened.

As a result, the effectiveness of the holographic elements is greatly reduced.

FIG. 21 shows the intensity distribution at the outgoing angle of dispersed and transmitted beam, where white beam is incident on the diffuser 98 (directional dispersion film) at an angle of incidence of 35°. The intensity ratio of the ordinate indicates the intensity ratio of incident beam 81 to outgoing beam 82 through the diffuser 98 shown in FIG. 22. The outgoing angle of the abscissa indicates the angle of linearly transmitted outgoing beam 821, the greater the angle with respect to the normal line of the diffuser 98 over the outgoing beam 821 being represented as an increase (+).

For the above reasons, when the visibility control film "Lumisty" serving as a directional dispersion film is laminated onto holographic elements, the image brightness is half or less of that prior to lamination, giving rise to the problem that it can only be used in a relatively dark room.

SUMMARY OF THE INVENTION

The present invention was arrived at in light of the above prior art problems and provides a holographic screen that maintains the brightness of a displayed image and can improve color reproducibility.

A first aspect of the present invention is a holographic screen for displaying images by diffracting and dispersing an image beam projecting by an image projector, comprising a main hologram for diffracting and dispersing an incident image beam from one of an upward angle and a downward angle, and a directional dispersion hologram, disposed on an image projector side of the main hologram, for dispersing and transmitting part of the image beam within a predetermined angle range centered on a direction of incidence thereof, and directly transmitting another part of the image beam.

The operational effects of the first aspect of the present invention are as follows.

The main hologram can increase the brightness of the displayed image when the image beam is incident at substantially the same angle as a preset angle of incidence of the image beam. Also, the main hologram can improve the color reproducibility of the displayed image by making the image incident to a width corresponding to the angle of incidence of the image beam.

The holographic screen of the present invention has the directional dispersion hologram disposed on the image projector side of the main hologram.

As a result, part of the image beam incident on the directional dispersing hologram is dispersed and transmitted within a predetermined angle range to be incident on the main hologram. Also, the other part of the image beam is directly transmitted in substantially the same direction as the direction of incidence, to be incident on the main hologram.

As the image beam directly transmitted through the directional dispersion hologram can be incident on the main hologram at substantially the same angle as the preset image beam angle of incidence of the main hologram, it is diffracted with high efficiency in substantially the forward direction and the brightness of the displayed image can be increased.

Meanwhile, because the image beam dispersed and transmitted by the directional dispersion hologram is incident on the main hologram to a width within the angle of incidence, this contributes to improving the color reproducibility of the displayed image.

Therefore, by maintaining the proportions of both the image beam directly transmitted and the image beam dispersed by the directional dispersion hologram to a certain extent, the brightness of the displayed image of the holographic screen can be maintained and the color reproducibility thereof can be improved.

As described above, according to the present invention, a holographic screen in which the brightness of the displayed image can be maintained, and color reproducibility can be improved, can be provided.

A second aspect of the present invention is a holographic screen for displaying images by diffracting and dispersing an image beam projecting by an image projector, wherein the holographic screen is produced by laminating, on a photosensitive material, a first master plate for diffracting and dispersing incident beam from one of an upward angle and a downward angle, and a second master plate for dispersing and transmitting part of the incident beam within a predetermined angle range centered on a direction of incidence thereof and directly transmitting another part of the incident beam.

The above holographic screen is made by multiply recording the first master plate and the second master plate on the photosensitive material.

The first master plate diffracts and disperses incident beam which is incident from either an upward angle or a downward angle. The second master plate, as well as dispersing and transmitting part of the incident beam within a predetermined range of angles centering around the direction of incidence, directly transmits another part of the incident beam.

Namely, the first master plate has the same function as the main hologram of the above first invention, and the second master plate has the same function as the directional dispersion hologram of the first invention.

Consequently, the above holographic screen is in the same state as when the main hologram and the directional dispersion hologram are superposed and recorded. As a result, the above described holographic screen has the same operational effects as the first invention.

Also, because the above holographic screen is formed by recording two master plates on a single photosensitive material, it can be made with a single layer material.

Thus, when the holographic screen is mass produced, as well as enabling a reduction in the number of processing steps, it also reduces the manufacturing cost. Also, compared to the case where the main hologram and directional dispersion hologram are laminated, because beam absorption due to the structural materials is reduced, the transmittance of the holographic screen can be increased.

As described above, according to the present invention, a holographic screen that maintains the brightness of the displayed image, and can improve color reproducibility, is provided.

DESCRIPTION OF PREFERRED EMBODIMENTS

Figure 1:
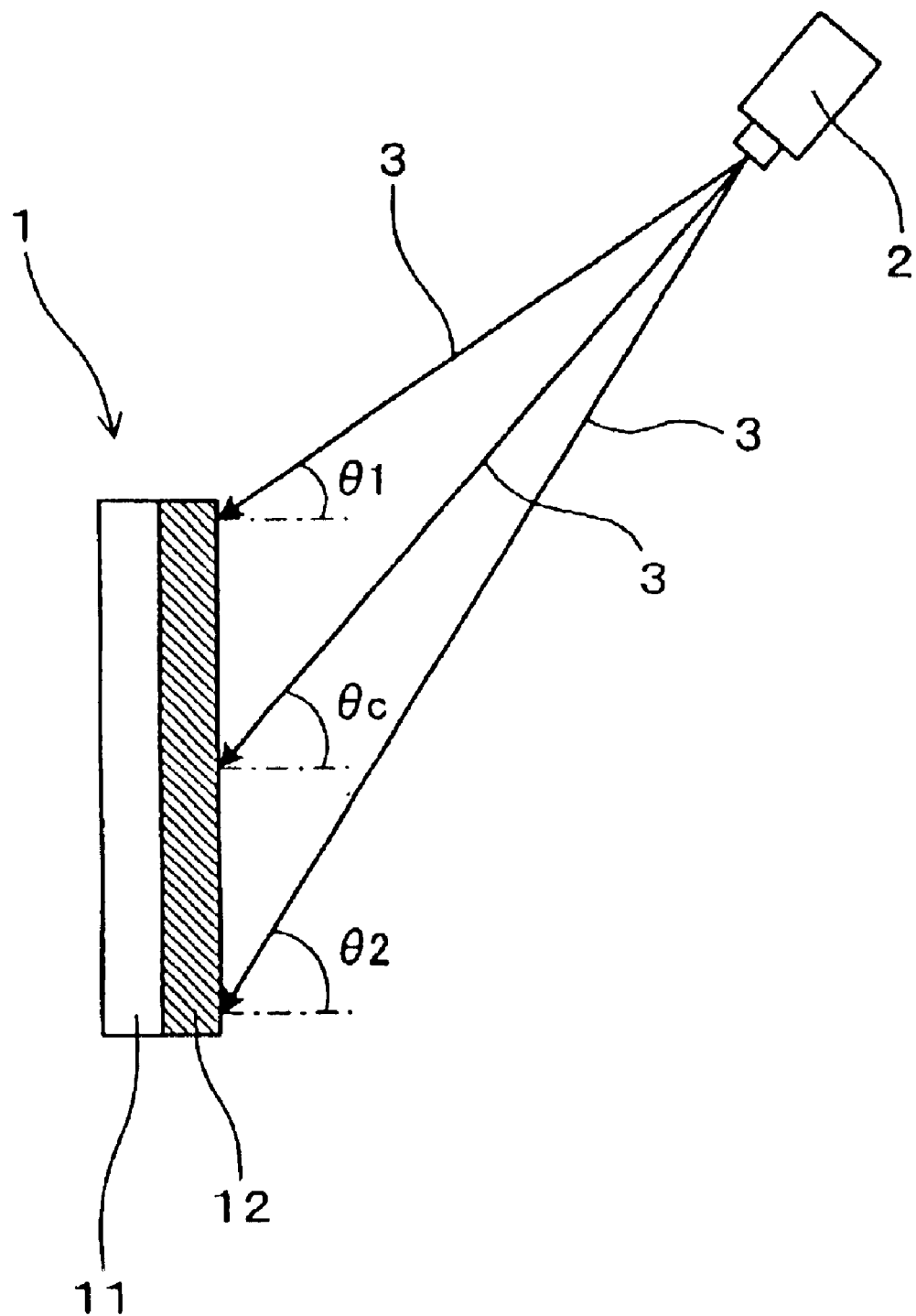
FIG. 1 is a simplified view for explaining a holographic screen according to a first embodiment of the present invention.

In a first aspect of the present invention, the projection angle of the image beam onto the center of the holographic screen from the image projector can be made, for example, an angle of 35° upward or downward. The main hologram can diffract and disperse in substantially the forward direction (the normal direction of the main hologram) the image beam incident at the projected angle.

In addition, direct transmittance is transmittance in substantially the same direction as the direction of incidence of the image beam; for example, a transmittance in a direction of no more than ±2° with respect to the direction of incidence.

Also, the directional dispersion hologram preferably disperses 20 percent to 70 percent of the image beam and directly transmits 30 to 80 percent of the image beam.

In this case, the intensity of the image beam directly transmitted through the directional dispersion hologram and the intensity of the dispersed image beam can be sufficiently maintained. As a result, the brightness of the displayed image of the holographic screen can be sufficiently maintained and color reproducibility can be sufficiently improved.

Where the proportion of dispersed image beam is less than 20 percent, or where the proportion of directly transmitted image beam exceeds 80 percent, it then becomes very difficult to maintain sufficient displayed image color reproducibility.

Meanwhile, if the proportion of dispersed image beam exceeds 70 percent, or where the proportion of directly transmitted image beam is less than 30 percent, it then becomes very difficult to maintain sufficient displayed image brightness.

Further, the directional dispersion hologram preferably disperses the image beam ±5° or more with respect to the direction of incidence thereof.

In this case, the angle of incidence of the image beam on the main hologram can be given sufficient width, therefore the color reproducibility of the displayed image can be sufficiently improved.

If the dispersion angle is less than ±5° with respect to the direction of incidence, it then becomes difficult to sufficiently improve the color reproducibility of the displayed image.

It is also preferable for the dispersion angle to be ±30° or less with respect to the direction of incidence on the directional dispersion hologram.

In this case the brightness of the displayed image of the holographic screen can be maintained and color reproducibility can be effectively improved. This is because, in a transmittance type hologram produced by a single color laser beam, where the angle of incidence of the reproduction beam is changed to reproduce all wavelengths of visible beam, the width of the angle of incidence of the reproduction beam is preferably as much as possible on the order of ±30°. Thus, if the image beam is dispersed in a range greatly exceeding this and made incident on the main hologram, the resulting beam that is dispersed over a wide angle does not contribute to improvement of the color reproducibility and also cannot contribute to improving the brightness of the image display. As a result, if the dispersion angle exceeds the above range, the only result is a decrease in brightness.

Accordingly, by limiting the dispersion angle as described above, brightness can be sufficiently maintained and color reproducibility can be effectively improved.

Moreover, the directional dispersion hologram, after a photosensitive material and a diffuser have been superposed, is preferably produced by radiating a reference beam from the diffuser side at a predetermined angle to a normal thereof, transmitting and diffusing it through the diffuser to make a diffused beam, and exposing the photosensitive material to the diffused beam.

In this case, a holographic screen that can sufficiently maintain brightness and improve color reproducibility can be easily attained.

Also, because the above diffuser is recorded as a hologram, the directional dispersion hologram can sufficiently maintain the proportion of directly transmitted image beam.

The above predetermined angle is preferably made substantially the same as the projection angle of the image beam with respect to the holographic screen.

Further, the above photosensitive material and diffuser can be disposed in a superposed state with, for example, transparent glass disposed therebetween.

In addition, the diffuser is preferably a directional dispersion film that diffuses only incident beam from within a predetermined longitudinal angle range and directly transmits incident beam from angles outside the predetermined longitudinal angle range, and the predetermined angle range preferably includes all angles of incidence of the image beam on an entire surface of the holographic screen.

In this case, a directional dispersion hologram that disperses part of the image beam incident on the main hologram is upward and downward directions can be attained. Therefore, by combining the directional dispersion hologram and the main hologram, a holographic screen with excellent color reproducibility can be easily attained.

Also, by recording the directional dispersion film on the directional dispersion hologram, the dispersion angle in the vertical direction of the image beam can be restricted and the image brightness of the holographic screen can be maintained.

Further, the vertical angle range can have, for example, an upper limit of 45° to 55° and a lower limit of 20° to 25°.

The diffuser can also be ground glass.

In this case, because the directional dispersion hologram disperses the image beam both vertically and horizontally, a holographic screen with even more excellent color reproducibility can be attained.

Moreover, by selecting a ground glass having a predetermined beam dispersion range, the degree of beam dispersion of the directional dispersion hologram can be easily controlled.

Additionally, the diffuser is preferably a laminate of a ground glass and a louver film disposed on the photosensitive material side of the ground glass.

In this case, if the degree of dispersion of the ground glass, the louver angle and visible angle of the louver film, and the angle of incidence of the reference beam on the diffuser are suitably set, relatively free control of the range corresponding to the angle of incidence of the image beam and the degree of dispersion of the manufactured directional dispersion hologram is possible.

Moreover, if the louver film is not used, although the degree of dispersion and dispersion direction of the manufactured directional dispersion hologram are determined by the degree of beam dispersion of the ground glass and the angle of incidence of the reference beam, the way they disperse is such that they are substantially symmetrical in the up and down direction of the incident beam axis. By disposing the louver film at the rear of the ground glass (the side from which transmitted beam exits), the thus attained directional dispersion hologram disperses non-symmetrically in the up and down direction and can further restrict the beam dispersion range.

Thereby, color reproducibility can be increased right across the entire holographic screen and effectively improved.

The louver film preferably has a louver angle of 10° and over.

In this case, a directional dispersion hologram that directly transmits the image beam from an upward or downward angle can be reliably attained.

In addition, the suitable louver angle differs depending on the projection angle of the image beam on the holographic screen and the required dispersion distribution of the directional dispersion hologram.

The directional dispersion hologram, after a reflector/diffuser having a half mirror surface formed by a half mirror coating layer and a diffusion mirror surface formed by a ground glass layer on a surface opposite the half mirror surface and a mirror coating layer is disposed at an angle with the half mirror surface facing the photosensitive material, may also be produced by radiating a reference beam from the half mirror surface side of the reflector/diffuser at an angle to the normal thereof, reflecting part of the reference beam on the half mirror surface to make it incident on the photosensitive material as a non-diffused beam and reflecting another part of the reference beam on the diffusion mirror surface to make it incident on the photosensitive material as a diffused beam, and exposing the photosensitive material with the non-diffused beam and the diffused beam interfering with each other on the photosensitive material.

In this case, the photosensitive material is exposed by interfering the non-diffused beam reflected in the half mirror surface with the diffused beam reflected in the diffusion mirror on the photosensitive material.

By this means, a directional dispersion hologram whose dispersion range is narrow and wherein the intensity of dispersed beam at an angle close to the directly transmitted beam beam is strong can be manufactured. Therefore, most of the image beam incident on the directional dispersion hologram is incident at an angle in substantially the same direction as a preset image beam projection angle with respect to the main hologram. As a result, the effectiveness of the holographic screen is improved and the brightness of the displayed image can be increased.

Next, in a second aspect of the present invention, although the order of lamination of the first master plate and second master plate on the photosensitive material is not particularly limited, from the viewpoint of improving the color reproducibility, the order of photosensitive material, first master plate, and second master plate is preferred.

The photosensitive material, first master plate and second master plate may also be laminated with, for example, transparent glass or the like disposed therebetween.

The second master plate preferably disperses 10 to 80 percent of the incident beam and directly transmits 20 to 90 percent of the incident beam.

In this case, the intensity of the image beam directly transmitted through, and the intensity of the image beam dispersed through, the second master plate recorded on the photosensitive material can be sufficiently maintained. Therefore, the brightness of the displayed image on the holographic screen can be sufficiently maintained and color reproducibility sufficiently improved.

The direct transmittance of the second master plate differs from the preferred value of the directional dispersion hologram in the first aspect of the present invention described above, with the ratio of laser beam intensity after transmittance through the master plates and laser beam intensity dispersed through the master plates being important in determining the hologram efficiency.

The second master plate preferably disperses the incident beam ±5° or more with respect to the direction of incidence thereof.

In this case, because a sufficiently wide angle of incidence of the image beam on the first master plate recorded on the photosensitive material can be achieved, the color reproducibility of the displayed image can be sufficiently improved.

First Embodiment

The holographic screen according to an embodiment of the present invention will be described with reference to FIGS. 1 to 4.

The holographic screen 1, as shown in FIG. 1, displays an image by diffracting and dispersing an image beam 3 projected by an image projector 2.

The holographic screen 1 has a main hologram 11 and a directional dispersion hologram 12 disposed on the image projector 2 side of the main hologram.

Figure 2:
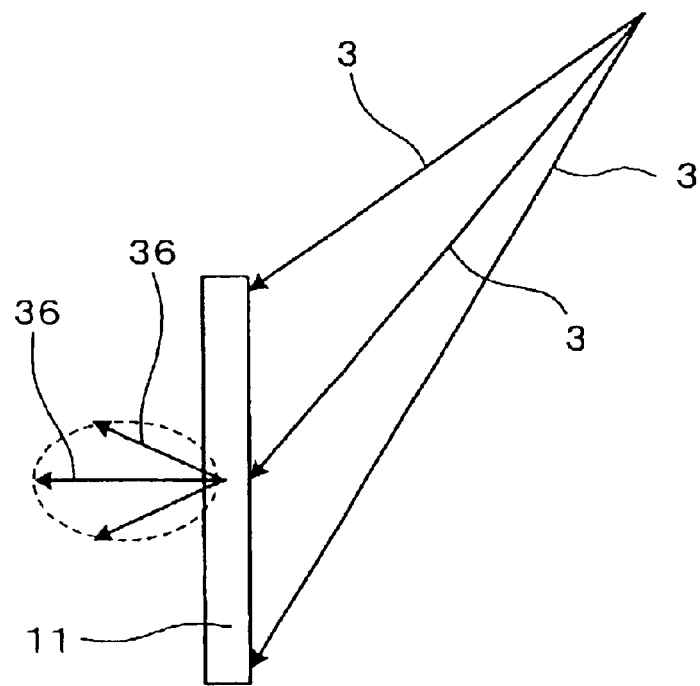
FIG. 2 is a simplified view explaining a main hologram according to the first embodiment.

The main hologram 11, as shown in FIG. 2, diffracts and disperses the image beams 3 incident from an upward angle into diffraction beams 36.

Figure 3:
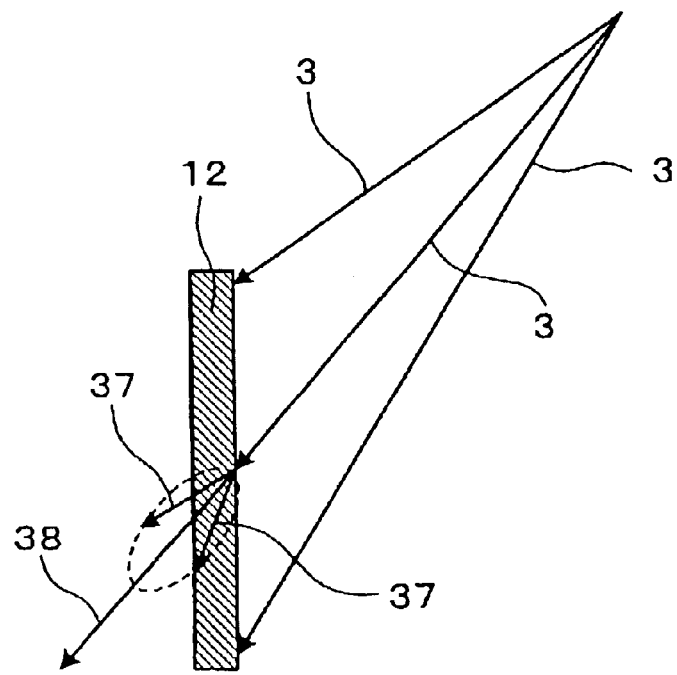
FIG. 3 is a simplified view explaining a directional dispersion hologram according to the first embodiment.

The directional dispersion hologram 12, as shown in FIG. 3, transmits part of the image beams 3 by dispersing them within a predetermined angle range centered on the direction of incidence of the image beams 3, and directly transmits the other part of the image beams 3. That is, part of the image beams 3 becomes dispersed transmitted beams 37, and the other part becomes a directly transmitted beam 38.

Figure 4:
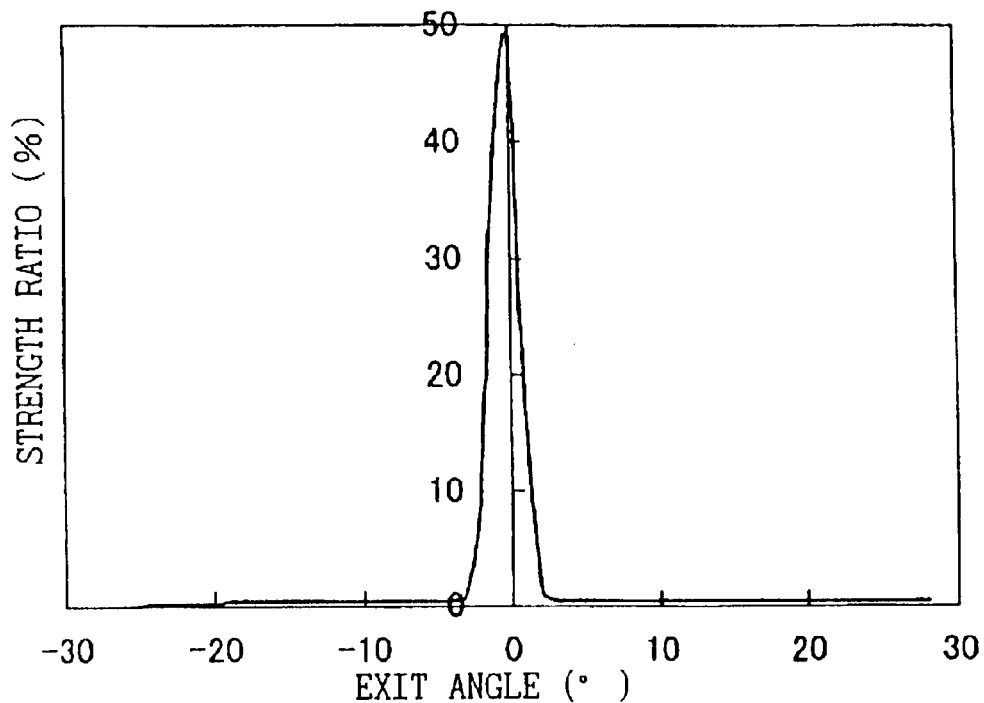
FIG. 4 is a graph indicating the intensity distribution of outgoing beam depending on the outgoing beam angle, when white beam is incident on the directional dispersion hologram according to the first embodiment.

Also, as shown in FIG. 4, the directional dispersion hologram 12 disperses approximately 50 percent of the image beams 3 and directly transmits approximately 50 percent. Here, direct transmittance is transmittance in substantially the same direction as the direction of incidence of the image beam, that is, a transmittance in a direction of ±2° or less with respect to the direction of incidence.

Figure 5:
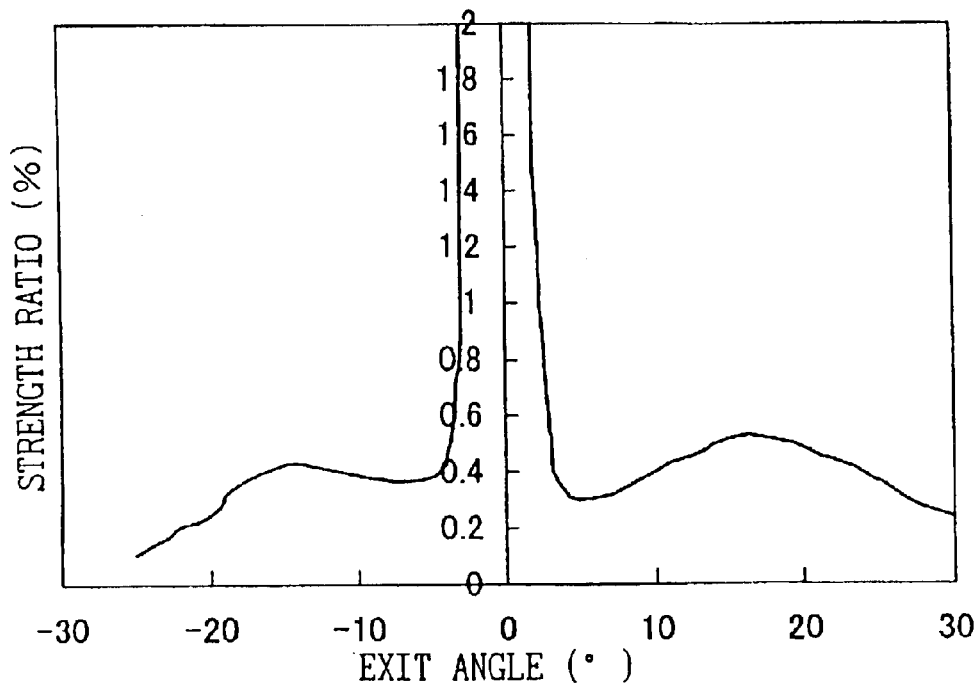
FIG. 5 is an enlarged portion of the chart of FIG. 4.

Further, as shown in FIG. 3 and FIG. 5, the directional dispersion hologram 12 can disperse the image beam 3 ±5° or more with respect to its direction of incidence.

Moreover, the dispersion angle is ±30° or less with respect to the direction of incidence on the directional dispersion hologram 12. Namely, less than 5 percent of the dispersed beam exceeds ±30° with respect to the direction of incidence.

Figure 21:
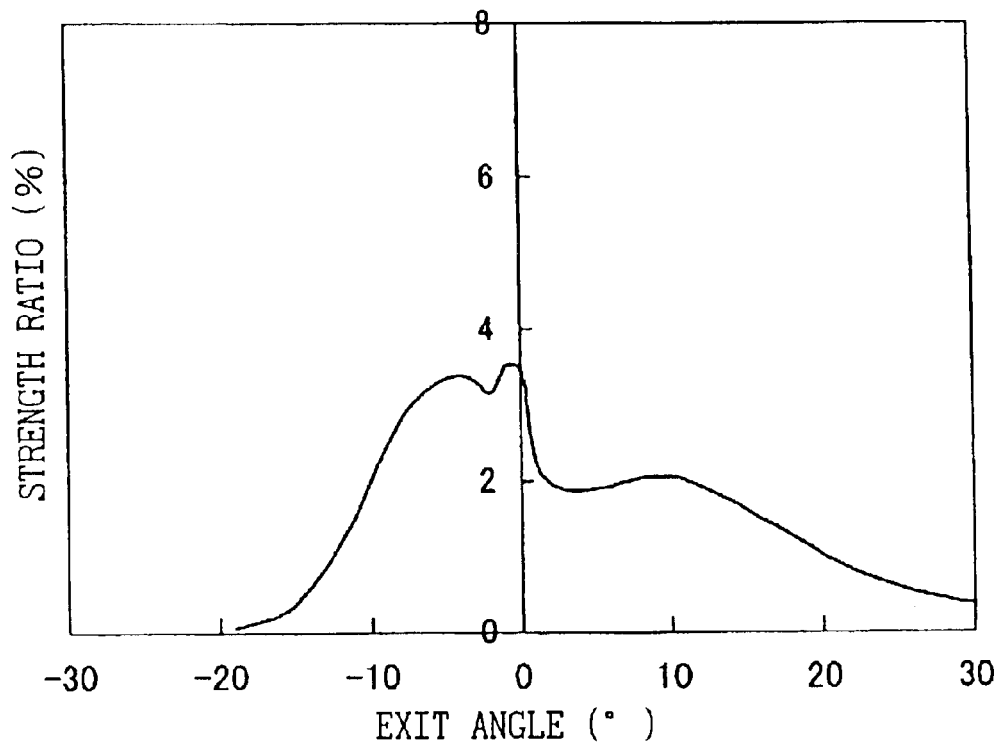
FIG. 21 is graph indicating the intensity distribution of outgoing beam depending on the outgoing beam angle, when white beam is incident on a directional dispersion film according to the prior art.
Figure 22:
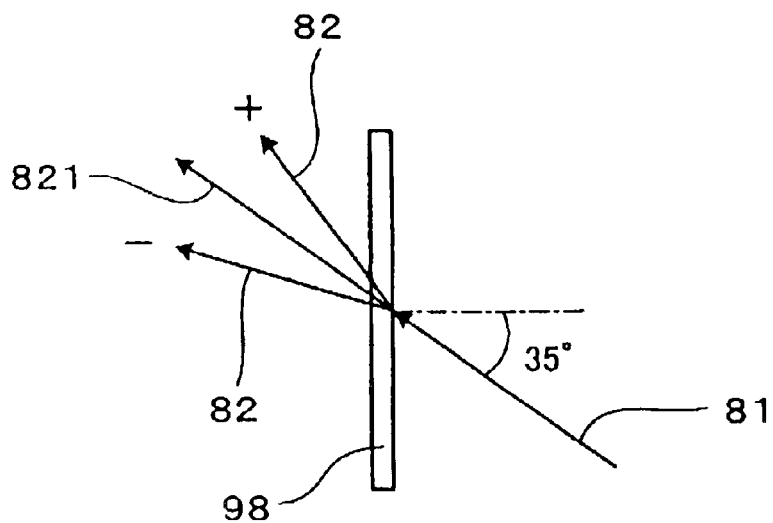
FIG. 22 is a simplified view illustrating the intensity distribution measurement method of outgoing beam according to the prior art.

The graphs shown in FIG. 4 and FIG. 5 show, in the same way as the graph of FIG. 21 showing a prior art example, the intensity distribution of outgoing beam from the directional dispersion hologram 12 of the present embodiment. FIG. 5 shows part of FIG. 4 expanded in the direction of the ordinate.

As shown in FIG. 1, the projection angle θc of the image beam 3 onto the center of the holographic screen 1 from the image projector 2 is approximately 35° upward. As shown in FIG. 2, the main hologram 11 can diffract and disperse in substantially the forward direction (the normal line of the main hologram) the image beam 3 incident at the projection angle θc.

Figure 20:
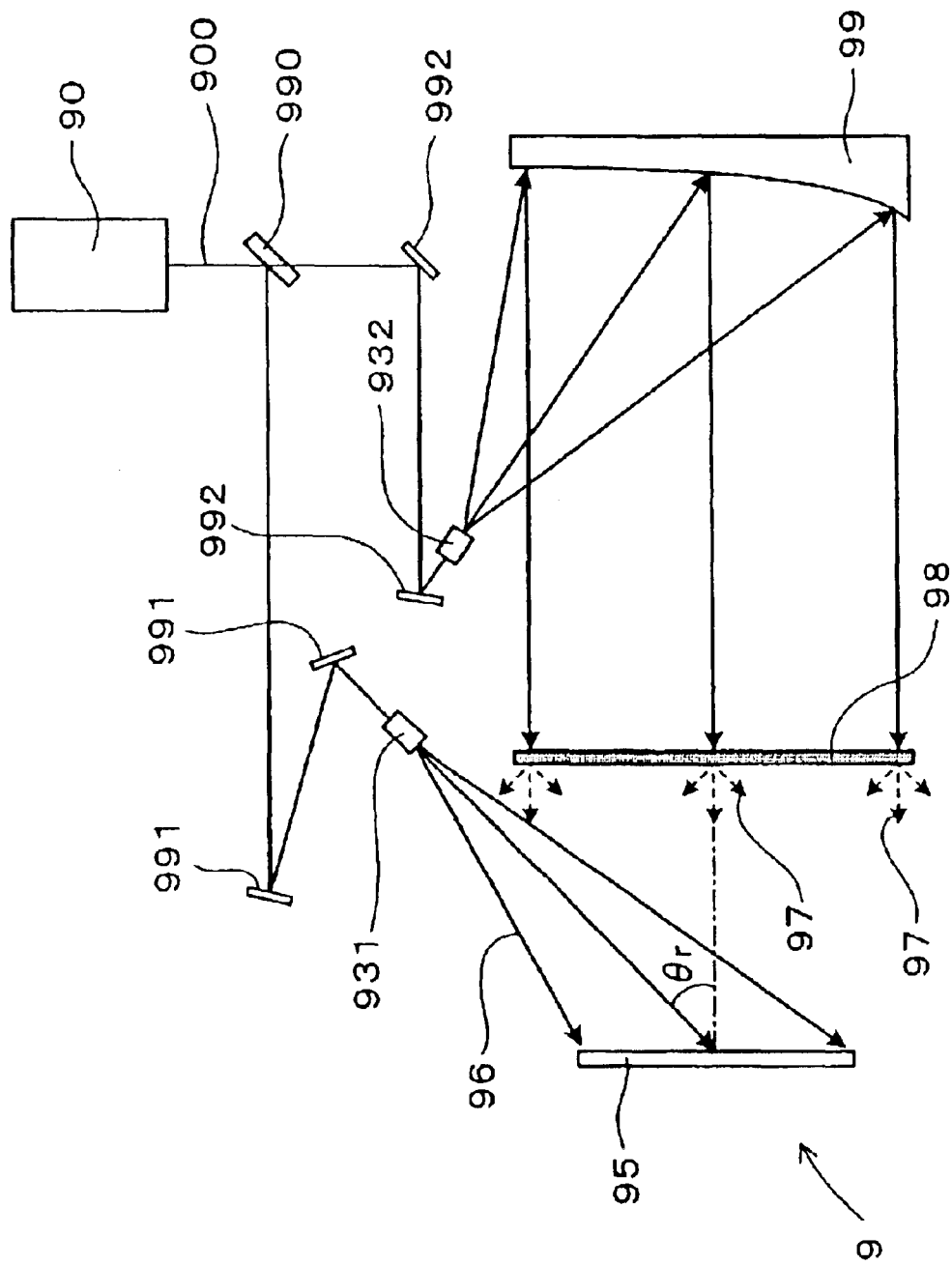
FIG. 20 is a simplified view for explaining a hologram element exposure optical system according to the prior art.

The main hologram 11 is manufactured by an exposure optical system (shown in FIG. 20) and method similarly to the prior art example described above.

Next, the operational effects of the present embodiment will be described.

The main hologram 11 can increase the brightness of the displayed image when the image beam is incident at substantially the same angle as a preset image beam projection angle. Also, the main hologram 11 can improve the color reproducibility of the displayed image by making the image beam incident with a given width at the angle of incidence thereof.

The holographic screen of the present invention, as shown in FIG. 1, has a directional dispersion hologram 12 disposed on the image projector 2 side of the main hologram 11.

Thus, part (approximately 50 percent) of the image beam 3 incident on the directional dispersion hologram 12 is transmitted by being dispersed within a predetermined angle range to be incident on the main hologram 11. Also, another part (approximately 50 percent) of the image beam 3 is directly transmitted in substantially the same direction as the direction of incidence to be incident on the main hologram 11.

As the image beam 3 directly transmitted through the directional dispersion hologram 12 is incident on the main hologram 11 at substantially the same angle as the preset angle of incidence of the image beam on the main hologram 11, it is diffracted in substantially the forward direction with high efficiency, so the brightness of the displayed image can be increased.

Meanwhile, as the image beam 3 dispersed and transmitted via the directional dispersion hologram 12 is incident on the main hologram 11 with a given width at the angle of incidence, this contributes to the improvement of the color reproducibility of the displayed image.

Consequently, by maintaining somewhat the proportion of both the directly transmitted image beam 3 and the dispersed image beam 3 of the directional dispersion hologram 12, the brightness of the displayed image of the holographic screen 1 can be maintained and the color reproducibility thereof can be improved.

Also, the directional dispersion hologram 12 disperses approximately 50 percent of the image beam 3 and directly transmits approximately 50 percent. Therefore, the intensity of the image beam 3 directly transmitted through the directional dispersion hologram 12 and the intensity of the image beam 3 dispersed through the directional dispersion hologram 12 can be sufficiently maintained. As a result, the brightness of the displayed image of the holographic screen 1 can be maintained and the color reproducibility thereof can be improved.

Further, the directional dispersion hologram 12 disperses the image beam ±5° or more with respect to the direction of incidence of the image beam 3. As a result, the angle of incidence of the image beam 3 on the main hologram 11 can be given sufficient width, and the color reproducibility of the displayed image can be sufficiently improved.

Further still, the above dispersion angle is ±30° or less with respect to the direction of incidence on the directional dispersion hologram 12. The brightness of the displayed image can thereby be maintained.

Moreover, because the directional dispersion hologram 12 directly transmits beam that is incident in the vicinity of the normal line direction, when the above holographic screen 1 is viewed from substantially the forward direction, the background thereof can be made visible.

As described above, according to the present embodiment, a holographic screen which can maintain the brightness of the displayed image, and can improve color reproducibility, can be provided.

First Test Experiment

Figure 6:
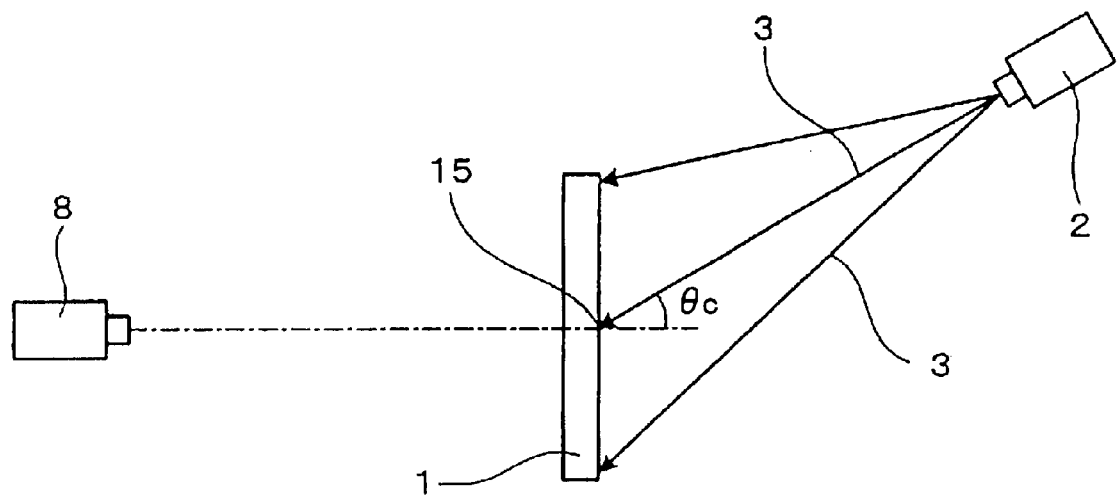
FIG. 6 is a simplified view illustrating the screen gain measurement method according to the first embodiment.

The present example, as shown in FIG. 6, is a test example to verify the performance of the holographic screen 1 of the first embodiment.

That is, the screen gain of the holographic screen and color reproducibility of the displayed image were evaluated.

Firstly, the main hologram 11 of the present invention by itself and a prior art holographic screen (that disclosed in Unexamined Patent Publication (Kokai) No. 11-202417) were compared with respect to the screen gain of the holographic screen 1 of the present invention.

The screen gain was obtained using the equation set forth below, and is used as an indicator of screen efficiency.

Screen gain=(brightness×π)/illumination

Brightness measurement is performed by, as shown in FIG. 6, projecting a white image from the image projector 2 onto the holographic screen 1, and placing a color/luminance meter 8 at a distance of 2 m in a normal line from the holographic screen 1. Then, a beam meter (not shown in the drawing) is placed in the center 15 on the image projector 3 side of the holographic screen 1, and the illumination is measured.

The measurement results were that the efficiency of the holographic screen 1 of the present invention as screen gain was 2.2, the screen gain of the main hologram 11 alone was 2.8, and the screen gain of the prior art holographic screen was 1.2.

As can be understood from these results, even when the holographic screen 1 of the present invention is a directional dispersion hologram 12 laminated on a main hologram 11, the reduction in efficiency is limited to approximately 20 percent. In contrast, the holographic screen of the prior art, due to having a directional dispersion film laminated onto a main hologram 11, has an efficiency reduction of approximately 60 percent.

In other words, it can be understood that the holographic screen of the present invention has greatly improved brightness compared to the holographic screen of the prior art.

Also, with regard to the color reproducibility of the holographic screen 1 of the present invention, it was able to reproduce favorable hues with no feeling of unnatural color from visual observation.

As described above, it can be understood that the holographic screen of the present invention according to the present embodiment has excellent brightness and color reproducibility of a displayed image.

Second Embodiment

This embodiment, as shown in FIGS. 7 to 11, is a first example of a manufacturing method of the holographic screen 1 explained in the first embodiment.

The directional dispersion hologram 12 forming the above holographic screen is manufactured as described below.

Figure 7:
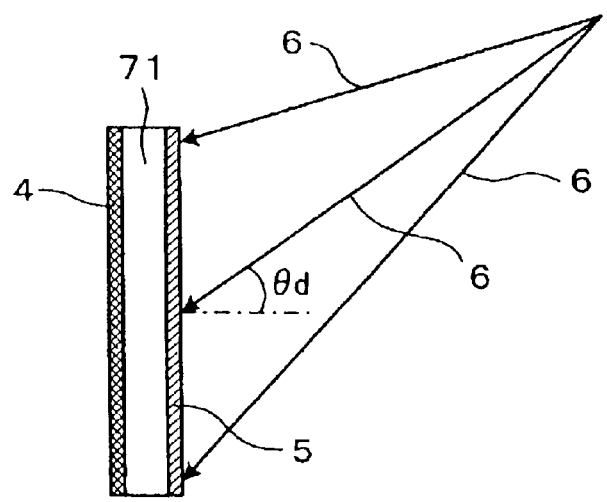
FIG. 7 is a simplified view of a directional dispersion hologram production method according to a second embodiment of the present invention.

That is, firstly, as shown in FIG. 7, a photosensitive material 4 and diffuser 5 are superposed. Then, a reference beam 6 is made incident thereon at a predetermined angle $\theta d$ to the normal from the diffuser side, and is transmitted through the diffuser 5 and diffused to become a diffused beam. The photosensitive material 4 is then exposed to the diffused beam.

Although the above predetermined angle $\theta d$ is preferably substantially the same as the angle of incidence $\theta c$ of the image beam (shown in FIG. 1), it can somewhat deviate therefrom.

Figure 8:
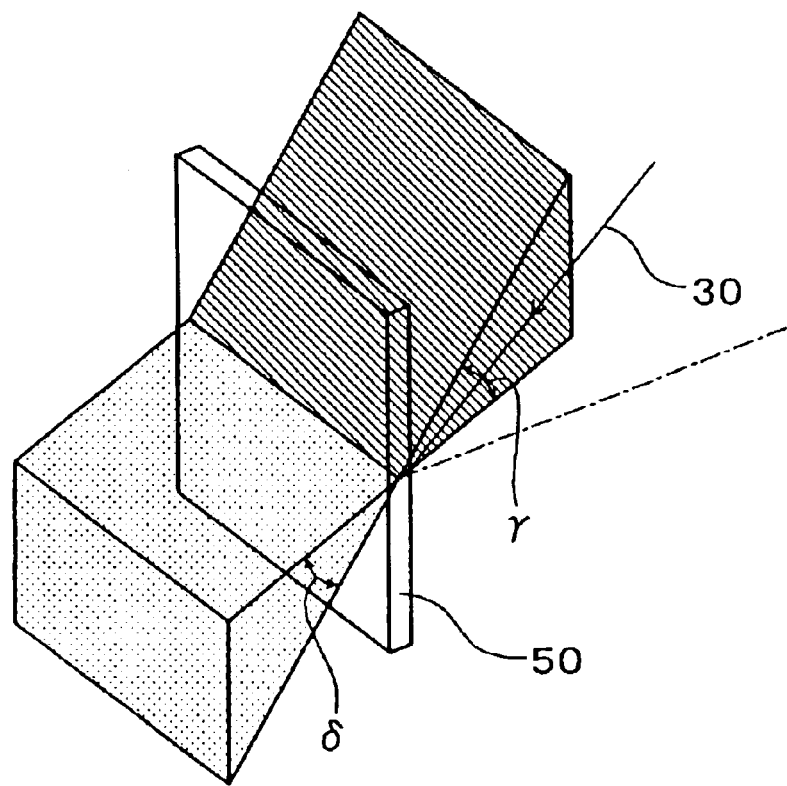
FIG. 8 is a perspective view of the directional dispersion film according to the second embodiment.
Figure 9:
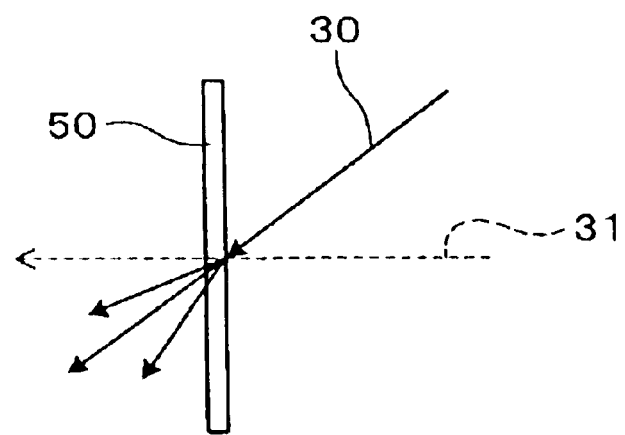
FIG. 9 is a side view of the directional dispersion film according to the second embodiment.
Figure 10:
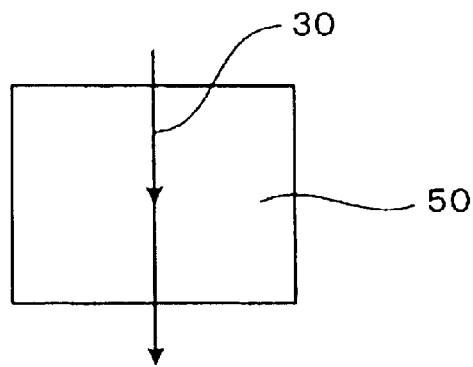
FIG. 10 is a front view of the directional dispersion film according to the second embodiment.

The above diffuser 5, as shown in FIGS. 8 to 10, is formed from a directional dispersion film 50 that diffuses only incident beam 30 within a predetermined vertical angle range $\gamma$, and directly transmits incident beam 31 from angles outside of this range. The predetermined vertical angle range $\gamma$ includes all angles of incidence ($\theta 1$ to $\theta 2$ in FIG. 1) of the image beam 3 on the entire surface of the holographic screen 1.

Specifically, as shown in FIG. 7, a photosensitive material 4 is bonded to one side of a sheet of transparent glass 71, and a directional dispersion film 50 is bonded to the other side. "Lumisty" MFY-2555 producted by Sumitomo Chemical Co. Ltd. was used as the directional dispersion film 50.

Lumisty MFY-2555, as shown in FIGS. 8 to 10, has the characteristic of vertically dispersing incident beam 30 within a range γ between 25° and 55° upward, and mainly within a range δ between 25° and 55° downward, with respect to the normal. This characteristic is the same at all points on Lumisty MFY-2555.

The angle of incidence of the reference beam 6 is included within this dispersible vertical angle of incidence range γ. Also, as shown in FIG. 10, the directional dispersion film 50 does not disperse incident beam 30 horizontally.

Figure 11:
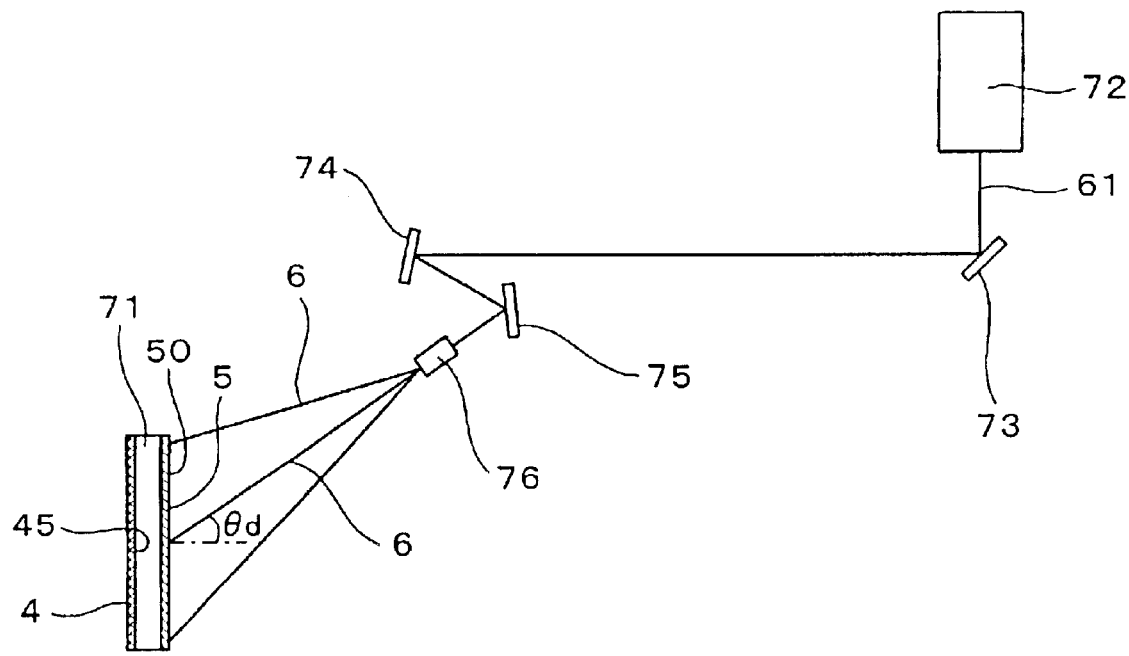
FIG. 11 is a simplified view for explaining the directional dispersion hologram exposure optical system according to the second embodiment.

The reference beam 6, as shown in FIG. 11, uses an argon laser beam 61 of a wavelength of 514 nm generated from a laser oscillator 72. Namely, the laser beam 61 is guided by mirrors 73, 74 and 75 to be incident on an objective lens 76 (Olympus MDPlan50). The laser beam is thereby made incident at approximately 35° on the center 45 of the photosensitive material 4 as divergent beams, and becomes the reference beam 6 which illuminates the entire surface of the photosensitive material 4.

The illumination distance of the reference beam 6 on the center 45 of the photosensitive material 4 is 1700 mm.

As the photosensitive material 6, a photopolymer HRF600X produced by DuPont was used. The size of the photosensitive material 4 and directional dispersion film 50 (Lumisty MFY-2555) is 800 mm×600 mm. After irradiation by the reference beam 6 at an energy of 30 mJ/cm$^2$, UV (ultraviolet) irradiation at a wavelength of 365 nm and energy of 0.1 J/cm$^2$ and thermal processing at 140° for 30 minutes are performed. Thereafter, a polyethylene terephthalate (PET) film produced by LINTEC Corporation is adhered thereto, and the photosensitive material 4 is removed from the transparent glass 71 to attain the directional dispersion hologram 12.

By laminating the directional dispersion hologram 12 to the main hologram 11, the holographic screen 1 is attained (refer to FIG. 1).

In the case of this example, a directional dispersion hologram 12 that vertically disperses the image beam 3 incident on the main hologram 11 can be attained. Consequently, by combining the directional dispersion hologram 12 with the above main hologram 11, a holographic screen having excellent color reproducibility can be attained.

Also, by recording the directional dispersion film on the directional dispersion hologram 12, the dispersion angle in the vertical direction of the image beam 3 can be restricted, and the image brightness of the holographic screen 1 can be maintained.

The efficiency of the directional dispersion hologram 12 can be controlled by the intensity of the reference beam 6, exposure, thickness of the photosensitive material 4, and the like.

Third Embodiment

Figure 12:
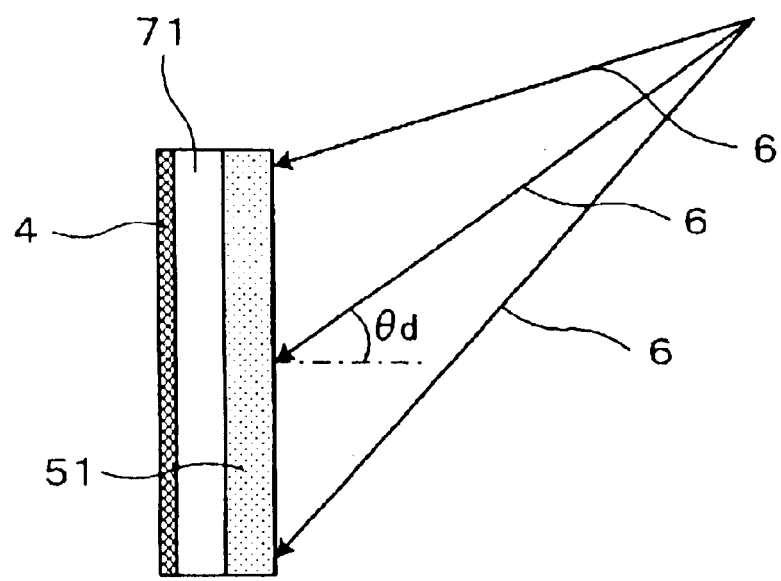
FIG. 12 is a simplified view of a directional dispersion hologram production method according to a third embodiment of the present invention.

The present embodiment, as shown in FIG. 12, is a second example of a manufacturing method of the holographic screen 1 disclosed in the first embodiment.

In manufacturing the directional dispersion hologram 12 forming the holographic screen 1, the diffuser recorded on the photosensitive material 4 is ground glass 51. Namely, ground glass 51 is used in place of the directional dispersion film 50 (Lumisty MFY-2555) used in the second embodiment.

The exposure optical system has a structure wherein the photosensitive material 4 and the ground glass 51 are superposed via a transparent glass sheet 71, and the reference beam 6 is made incident thereon from an oblique direction.

Dispersed beams generated by transmitting the reference beam through the ground glass 51 interfere with each other on the surface of the photosensitive material 4 to expose the photosensitive material 4. The directional dispersion hologram 12 is thereby formed.

Everything else is the same as in the second embodiment.

In this case, because the directional dispersion hologram 12 disperses the image beam both vertically and horizontally, a holographic screen 1 have even more better color reproducibility can be attained.

Also, by selecting ground glass 51 having a predetermined beam dispersion range, the degree of beam dispersion of the directional dispersion hologram 12 can be easily controlled.

Additionally, the angle of incidence θd of the reference beam 6 can be relatively easily determined.

All other operational effects are the same as those of the second embodiment.

Fourth Embodiment

Figure 13:
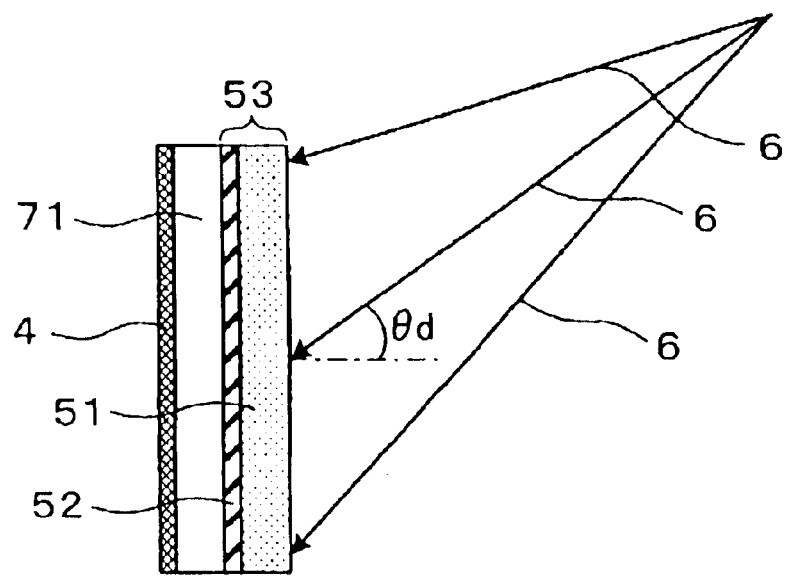
FIG. 13 is a simplified view of a directional dispersion hologram production method according to a fourth embodiment of the present invention.
Figure 14:
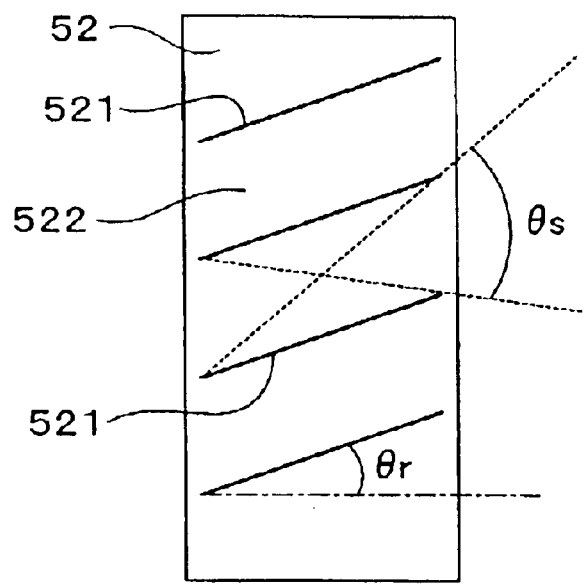
FIG. 14 is a simplified view for explaining a louver film according to the fourth embodiment.
Figure 15:
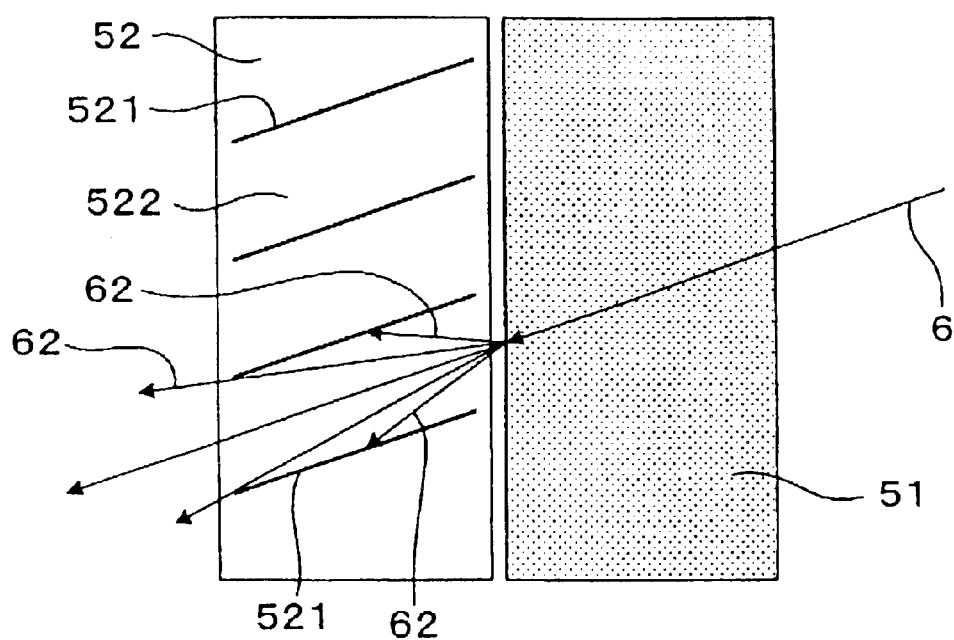
FIG. 15 is a simplified view for explaining the operational effects of the louver film according to the fourth embodiment.

This embodiment, as shown in FIGS. 13 to 15, is a third example of a method for manufacturing the holographic screen 1 disclosed in the first embodiment.

In manufacturing the directional dispersion hologram 12 forming the holographic screen 1, the diffuser recorded on the photosensitive material 4 is a laminate 53 of louver film 52 and ground glass 51. Namely, the laminate 53 is used in place of the directional dispersion film 50 (Lumisty MFY-2555) used in the second embodiment.

The louver film 52 is disposed on the ground glass 51 or on the photosensitive material 4 side of the ground glass 51.

Also, the louver film 52 has a louver angle θr of 10° or more (FIG. 14). The suitable louver angle θr differs according to the projection angle θc of the image beam on the holographic screen 1 (FIG. 1) and the required dispersion distribution of the directional dispersion hologram 12, and is substantially the same as the projection angle θc of the image beam 3.

Everything else is the same as in the second embodiment.

The function of the louver film 52 will be explained using FIG. 14 and FIG. 15. As shown in FIG. 14, the louver film 52 has a structure wherein a black layer 521 and a transparent layer 522 are alternately disposed in the vertical direction. These layers are inclined at a louver angle of θr with respect to the normal line of the louver film 52, and have a visibility angle of an angle of incidence range θs of transmissible incident beam.

The state of dispersed beam 62 when the louver film 52 and ground glass 51 are superposed and irradiated with the reference beam 6 is shown in FIG. 15. In the dispersed beam 62 produced after the reference beam 6 is transmitted through the ground glass 51, the dispersed beam 62 whose dispersion angle is high and intensity is low is absorbed by the black layers 521 of the louver film 52, and only the dispersed beam 62 whose intensity is high is transmitted at the visible angle θs.

In this way, in the present embodiment a directional dispersion hologram 12 can be manufactured in which dispersed beam in low intensity directions, which does not contribute much to improving color reproducibility, is eliminated. Consequently, the proportion of the image beam 3 that is directly transmitted without being dispersed by the directional dispersion hologram 12 can be increased. As a result, the efficiency of the holographic screen 1, namely the brightness of the displayed image, can be increased.

Also, if the degree of dispersion of the ground glass 51, the louver angle θr and visible angle θs of the louver film 53, and the angle of incidence of the reference beam 6 on the diffuser 53 are suitably set, relatively free control of the range corresponding to the angle of incidence of the image beam and the degree of dispersion of the manufactured directional dispersion hologram 12 is possible.

In addition, if the louver film 52 is not used, although the degree of dispersion and dispersion direction of the manufactured directional dispersion hologram 12 are determined by the degree of beam dispersion of the ground glass 51 and the angle of incidence of the reference beam 6, the way in which they disperse is such that they are substantially symmetrical in the vertical direction of the incident beam axis. As shown in FIG. 15, by disposing the louver film 52 at the rear of the ground glass 51 (the side from which transmitted beam exits), the thus attained directional dispersion hologram 12 disperses non-symmetrically in the vertical direction and can further restrict the range of beam dispersion.

As a result, color reproducibility can be increased over the entire surface of the holographic screen 1, effectively improving color reproducibility.

Fifth Embodiment

Figure 16:
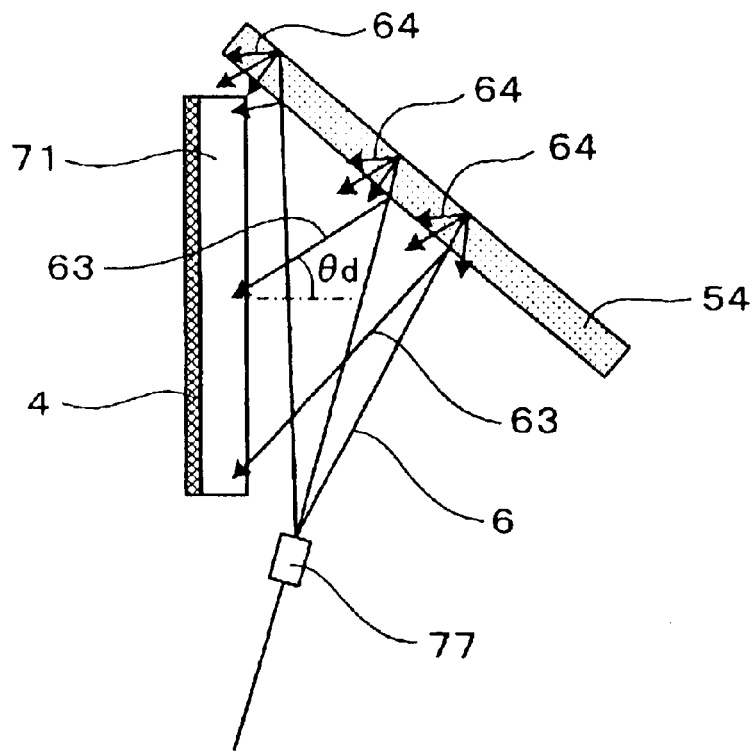
FIG. 16 is a simplified view of a directional dispersion hologram production method according to a fifth embodiment of the present invention.
Figure 17:
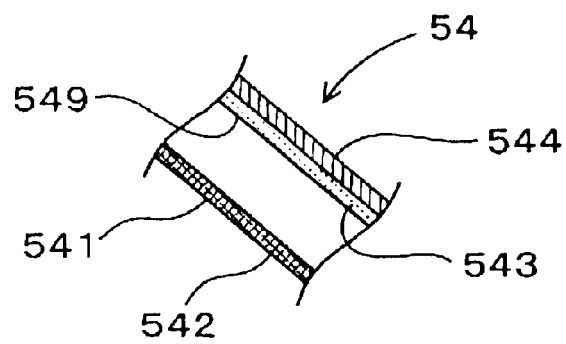
FIG. 17 is a sectional view of a reflector/diffuser according to the fifth embodiment.

This embodiment, as shown in FIG. 16 and FIG. 17, is a fourth example of a method for manufacturing the holographic screen 1 disclosed in the first embodiment.

In the present embodiment, the optical system shown in FIG. 16 is used in manufacturing the directional dispersion hologram 12 forming the holographic screen 1.

The optical system has the photosensitive material 4 adhered to transparent glass 71, an objective lens 77 for forming a reference beam 6, with a laser beam, as divergent beams, and a reflective diffuser 54 for reflecting and diffusing the reference beam 6.

The reflective diffuser 54, as shown in FIG. 17, has a half mirror surface 541 formed by a half mirror coating layer 542, and a diffusion mirror surface 549 formed by a ground glass layer 543 on a surface opposite the half mirror surface 541 and a mirror coating layer 544.

The ground glass layer 543 is formed by a ground glass roughening process, and the mirror coating layer 544 is formed by performing aluminum vapor deposition from above the ground glass layer 543.

The reflective diffuser 54 is disposed at an angle with the half mirror surface 541 facing the photosensitive material 4.

The reference beam 6 is incident from the half mirror surface 541 side of the reflective diffuser 43 at an angle to the normal thereof. By this means, part of the reference beam 6 is reflected in the half mirror surface 541 and is incident on the photosensitive material 4 as a non-diffused beam 63, while the rest of the reference beam 6 is diffused and reflected in the diffusion mirror surface 549 and is incident on the photosensitive material 4 as a diffused beam 64.

The non-diffused beam 63 and diffused beam 64 are then meshed on the photosensitive material 4 to expose the photosensitive material 4.

The angle of the reflective diffuser 54 is set so that the non-diffused 63 is at the same angle as the angle of incidence $\theta c$ of the image beam 3 in FIG. 1.

Everything else is the same as the second embodiment.

In the present embodiment, because divergent beams, which are the diffused beam 64 and the non-diffused beam 63, interfere with each other, a directional dispersion hologram 12 can be manufactured in which the dispersion range thereof is narrow and the intensity of the dispersed beam at angles close to the directly transmitted beam is high. As a result, most of the image beam 3 incident on the directional dispersion hologram 12 is substantially the same angle as the preset image projection angle with respect to the main hologram 11.

In contrast to this, in the second to fourth embodiments, because only dispersed beams interfere with each other, the dispersion range is relatively wide and the dispersed beam intensity at angles close to the directly transmitted beam becomes proportionally weaker. As a result, the image beam incident at substantially the same angle as the preset image projection angle is relatively small.

Due to this difference, the holographic screen attained by the present embodiment further increases these improvements and has even higher displayed image brightness than the second to fourth embodiments.

All other operational effects are the same as the first embodiment.

The choice of any one of the second to fifth embodiments as the directional dispersion hologram will differ depending on the environment in which the holographic screen is used.

That is, if it is used in a bright environment, the directional dispersion hologram of the fifth embodiment with the highest displayed image brightness would be advisable. This is because, in a bright environment, color distinction is difficult and image quality is determined by high display brightness.

Conversely, in a relatively dark environment, the directional dispersion hologram of the second to fourth embodiments, whose color reproducibility effectiveness is higher, can be suitably selected. This is because, in a dark environment, while the image is easily visible even if the brightness is relatively low, changes in hue also stand out easily.

Sixth Embodiment

Figure 18:
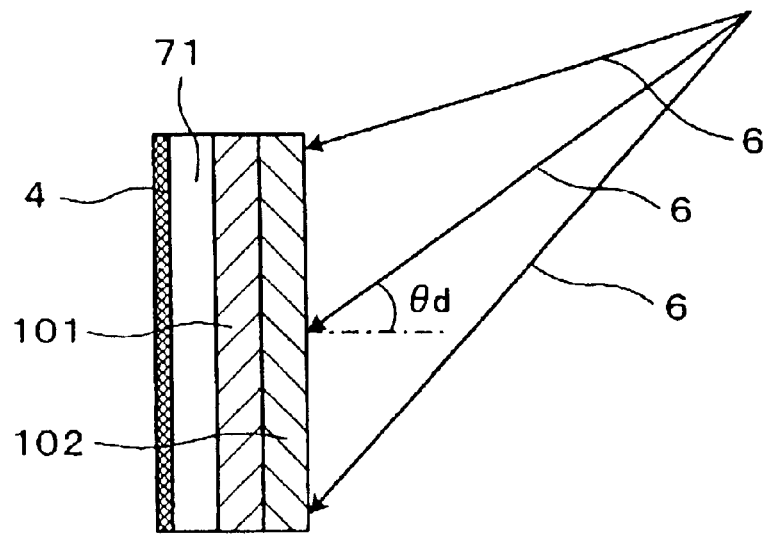
FIG. 18 is a simplified view of a holographic screen production method according to a sixth embodiment of the present invention.
Figure 19:
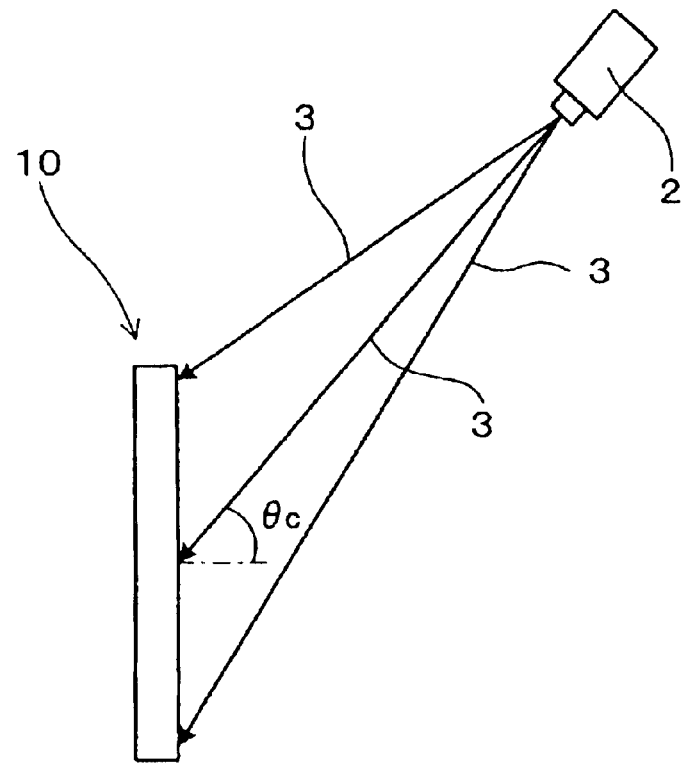
FIG. 19 is a simplified view of the holographic screen according to the sixth embodiment.

This embodiment, as shown in FIGS. 18 and 19, is an example of forming a holographic screen 10 by recording a first master plate 101 and a second master plate 102 on the photosensitive material 4.

The first master plate 101 diffracts and disperses beam that is incident from an upper angle. The second master plate 102 disperses and transmits part of the incident beam at a predetermined angle range around the direction of incidence thereof, and directly transmits the remaining part of the incident beam.

In other words, the first master plate 101 has the same function as the main hologram 11 of the second embodiment (FIG. 2), and the second master plate 102 has the same function as the directional dispersion hologram 12 of the second embodiment (FIG. 3).

In manufacturing the above holographic screen 10, as shown in FIG. 18, the first master plate 101 and second master plate 102 are laminated onto the photosensitive material 4 in that order. Then the reference beam 6 is irradiated from first master plate 101 and second master plate 102 side, so that the first master plate 101 and second master plate 102 are superposed and recorded in the photosensitive material 4.

The holographic screen 10 is thereby manufactured.

Everything else is the same as in the first and second embodiments.

The holographic screen 1, as described above, is formed by superposed recording of the first master plate 101 and the second master plate 102, having the same functions as the main hologram 11 and directional dispersion hologram 12 of the first embodiment, on the photosensitive material 4.

Consequently, the above holographic screen 10 is in the same state as that wherein the main hologram 11 and directional dispersion hologram 12 are superposed and recorded. As a result, the holographic screen 10 has the same operational effects as the holographic screen 1 of the first embodiment.

Further, the holographic screen 10, because two master plates are recorded on a single layer photosensitive material 4, can be formed by a single layer material, as shown in FIG. 19.

As a result, when mass producing the holographic screen 10, as well as being able to reduce the number of processes, the manufacturing cost can also be reduced. Also, compared to the case where the main hologram 11 and directional dispersion hologram 12 are laminated, beam absorption by the structural materials is reduced and transmittance increased.

All other operational effects are the same as the first embodiment.

In each of the above embodiments, although examples have been given of holographic screens wherein the image beam is projected from an upward angle, the present invention can also be applied to holographic screens in which the image beam is projected from a downward angle.

What is claimed is:

1. A holographic screen for displaying images by diffracting and dispersing an image beam projecting by an image projector, comprising:

a main hologram for diffracting and dispersing an incident image beam from one of an upward angle and a downward angle; and a directional dispersion hologram, disposed on an image projector side of the main hologram, for dispersing and transmitting part of the image beam within a predetermined angle range centered on a direction of incidence thereof, and directly transmitting another part of the image beam;

wherein the directional dispersion hologram, after a photosensitive material and a diffuser have been superposed, is produced by radiating a reference beam from the diffuser side at a predetermined angle to a normal thereof, transmitting and diffusing it through the diffuser to make a diffused beam, and exposing the photosensitive material to the diffused beam.

2. The holographic screen according to claim 1, wherein the diffuser is a directional dispersion film that diffuses only incident beam from within a predetermined longitudinal angle range and directly transmits incident beam from angles outside the predetermined longitudinal angle range, and the predetermined angle range includes all angles of incidence of the image beam on an entire surface of the holographic screen.

3. The holographic screen according to claim 1, wherein the diffuser is ground glass.

4. The holographic screen according to claim 1, wherein the diffuser is a laminate of ground glass and louver film disposed on the photosensitive material side of the ground glass.

5. The holographic screen according to claim 4, wherein the louver film has a louver angle of 100 and over.

6. A holographic screen manufacturing method for manufacturing a holographic screen for displaying images by diffracting and dispersing an image beam projected by an image projector, comprising the steps of:

arranging a main hologram for diffracting and dispersing an incident image beam from one of an upward angle and a downward angle; and arranging a directional dispersion hologram, disposed on an image projector side of the main hologram, for dispersing and transmitting part of the image beam within a predetermined angle range centered on a direction of incidence thereof, and directly transmitting another part of the image beam, wherein the directional dispersion hologram is produced by, after a photosensitive material and a diffuser have been superposed, radiating a reference beam from the diffuser side at a predetermined angle to a normal thereof, transmitting and diffusing it through the diffuser to make a diffused beam, and exposing the photosensitive material to the diffused beam.

7. The holographic screen manufacturing method according to claim 6, wherein the diffuser is ground glass.

8. The holographic screen manufacturing method according to claim 6, wherein the diffuser is a laminate of ground glass and lower film disposed on the photosensitive material side of the ground glass.

9. The holographic screen manufacturing method according to claim 8, wherein the louver film has a louver angle of 10° and over.

10. The holographic screen manufacturing method according to claim 6, wherein the directional dipersion hologram is produced by, after a reflector/diffuser having a half mirror surface formed by a half mirror coating layer and a diffusion mirror surface formed by a ground glass layer on a surface opposite the half mirror surface and a mirror coating layer has been disposed at an angle with the half mirror surface facing the photosensitive material, radiating a reference beam from the half mirror surface side of the reflector/diffuser at an angle to the normal thereof, reflecting part of the reference beam on the half mirror surface to make it incident on the photosensitive material as a non-diffused beam and reflecting another part of the reference beam on the diffusion mirror surface to make it incident on the photosensitive material as a diffused beam, and exposing the photosensitive material with the non-diffused beam and the diffused beam interfering with each other on the photosensitive material.

* * * * *